Oct. 16, 1956 — W. SPRINZING — 2,766,737
INJECTION VALVE FOR ROTARY TYPE INTERNAL COMBUSTION ENGINE
Filed June 8, 1954 — 2 Sheets-Sheet 1
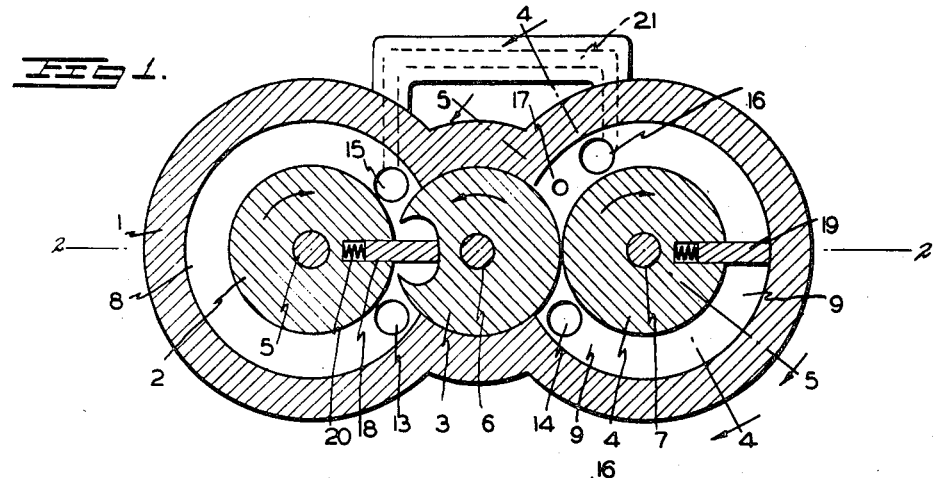
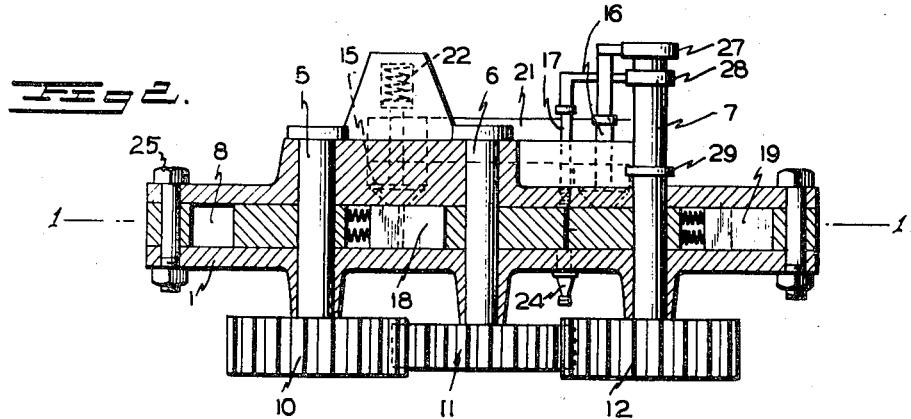
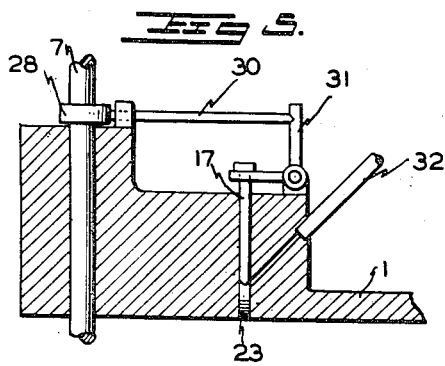
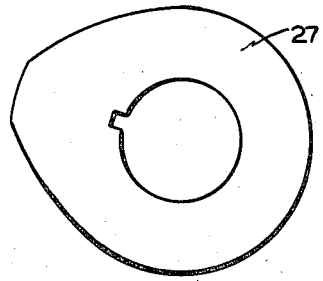
INVENTOR
WILLIAM SPRINZING
BY Ralph T. Bassett
ATTORNEY

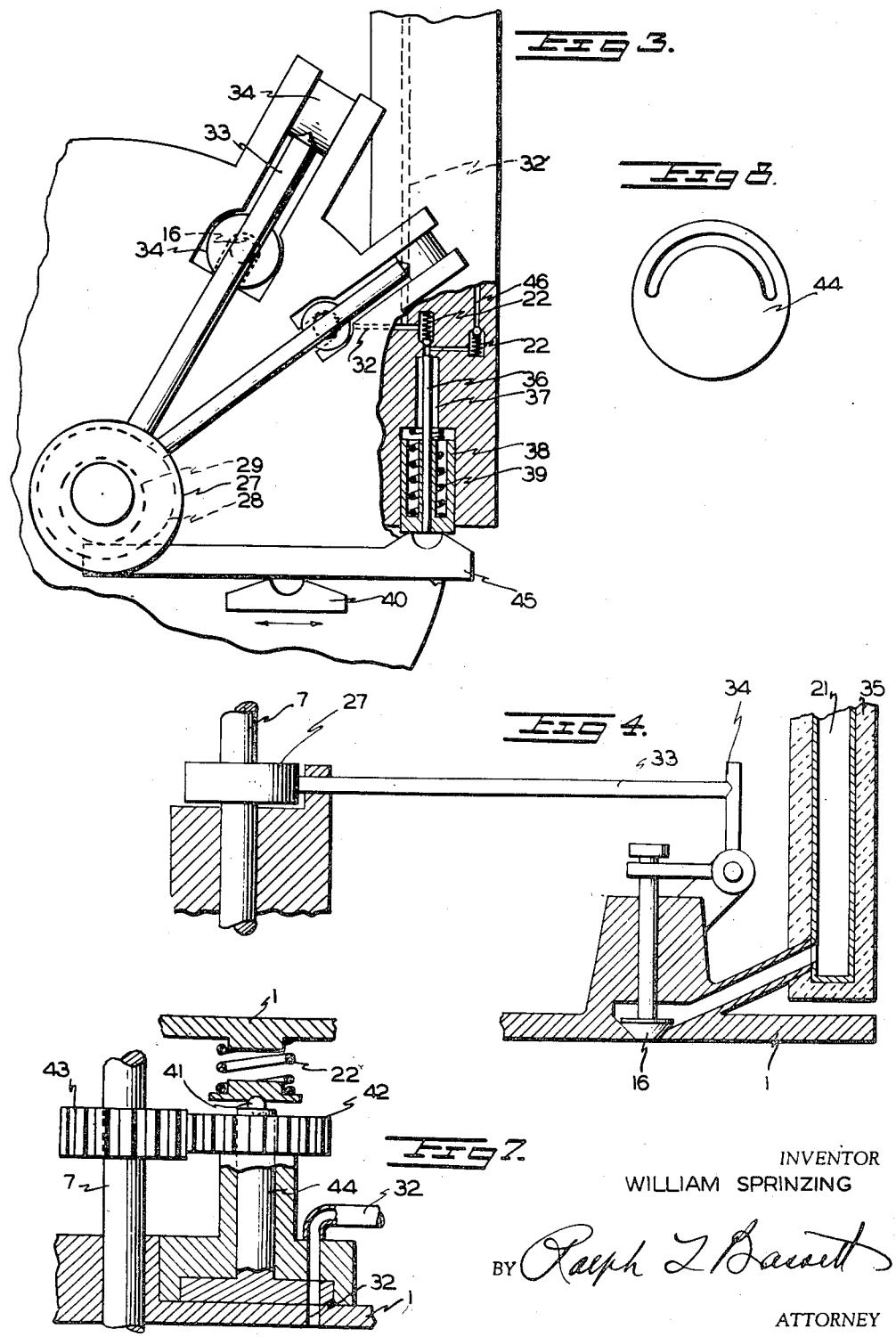

United States Patent Office 2,766,737
Patented Oct. 16, 1956

2,766,737

INJECTION VALVE FOR ROTARY TYPE INTERNAL COMBUSTION ENGINE

William Sprinzing, Wisconsin Dells, Wis.

Application June 8, 1954, Serial No. 435,286

3 Claims. (Cl. 123—13)

This invention relates to internal combustion engines and the principal object is to provide new means of charging the combustion chamber of the engine to the effect that power from the engine is derived from the increase in volume rather than through mean effective pressure. While the invention is especially adapted for use with rotary engines of the type in which air is compressed and delivered to the combustion chamber, it is not limited to this type of engine.

One of the principal objects of the invention is to provide novel fuel and air valves in an engine.

A further object is to provide air and fuel valves with operating mechanism of such a character that the fuel and air valves are opened in sequence, particularly with the fuel valve being opened somewhat in advance of the full opening of the air valve.

Further objects and advantages of the invention will become more apparent as the description proceeds.

Fig. 1 of the drawings is a section on line 1—1 of Fig. 2;

Fig. 2 is a section on line 2—2 of Fig. 1, the sections 1 and 2 being at right angles to each other;

Fig. 3 is a detailed view partly in section of the fuel valve, the compressed air valve and of the fuel pump;

Fig. 4 is a section on line 4—4 of Fig. 1;

Fig. 5 is a section on line 5—5 of Fig. 1 showing the fuel valve;

Fig. 6 is a detailed view of a cam which operates the air valve;

Figs. 7 and 8 are sectional views of a modified form of the fuel valve.

In the drawings numeral 1 indicates housing sections which are secured together by bolts 25, as best shown in Fig. 2. Numeral 2 indicates a compressor rotor which is keyed to a shaft 5, a gear 10 being mounted on the end of the shaft outside of the housing 1. Numeral 4 indicates the rotor of the engine and this rotor is keyed to a shaft 7 which extends to the outside of the housing 1 and has mounted thereon a gear 12 which is keyed thereto. An abutment rotor 3 mounted on the shaft 6 is mounted between the chambers 8 and 9 of the compressor and engine, respectively. Shaft 6 extends outside of the casing and has mounted thereon a gear 11. The gears 10, 11 and 12 interengage so that the compressor rotor is driven by the engine rotor. The compressor rotor 2 has a slot in which slides a compressor vane 18, the vane being urged outwardly by a spring 20. The engine rotor has a similar vane 19. The abutment rotor 3 is provided with an epicycloidal cavity into which the vanes 18 and 19 of the compressor and engine, respectively, engage as the compressor rotor and engine rotor revolve, moving in the direction of the arrow indicated in Fig. 1. Compressed air is supplied by the compressor through a check valve 15 into an air receiving chamber 21 from which the air is delivered through valve 16 into the engine cylinder. The air chamber 21 is insulated by any suitable material 35, Figure 4. Numeral 17 indicates a fuel valve which opens into the engine chamber 9 and 16 indicates an air valve which admits air from the receiver 21 into the cylinder 9 to support combustion therein.

The shaft 7 has mounted thereon three cams 27, 28 and 29, which operate the air valve, the fuel valve and the fuel pump, respectively. As shown in Figure 4, a rod 33 is movable vertically by the cam 27 and through a rock arm 34 operates the air valve 16. As shown in Figure 5, the cam 28 operating through a push rod 30 and a rock arm 31 operates the fuel valve 17. Fuel is ejected through a number of discs 23, which have very small holes, into the combustion chamber 9 where the said fuel is ignited by a conventional spark plug 24 (Figure 2). The ignition system of the engine is conventional and consequently is not shown.

The fuel pump comprises a piston 36 slidable in a sleeve 37. It is moved on its pumping stroke by a lever 45 pivotally engaging a block 40 and moved on its suction stroke by a spring 39 in a tappet 38. The lever 45 is rocked on its pivot by cam 29. Fuel enters the pump chamber from fuel line 46, passes through a ball valve which is held seated by a light spring 22 and is discharged through a similar spring seated ball valve into passage 32 through which it passes to the fuel valve 17 and through a number of perforations into the combustion chamber. A line 32' branching from line 32 may supply fuel to one or more additional engine cylinders.

The operation of the valves 16 and 17 is so timed that the fuel injected through valve 17 is ignited before the air valve 16 is fully opened and the air is continuously supplied to the combustion chamber 9 so that there is a continuous combustion. This operation is effected by making the configurations of the cams 27 and 28 such as to give the desired operative sequence.

After the engine rotor has moved to the point where the vane has passed beyond the outlet 14, the exploded gases or power gases may then exhaust to atmosphere.

In the modification shown in Figs. 7 and 8 the air supply valve 44 is a rotary valve. It is operated by gearing 43 mounted on the shaft 7 and controls passage of the air supply through conduit 32 through a port in the valve 44 into the engine cylinder. The operation of this form of the device functionally is substantially the same as that in the preferred form of Fig. 4. The valve is held in sealing engagement with its seat by a spring 22, seating on a disk engaging a ball 41.

In operation air enters the compressor chamber 8 through inlet port 13, is compressed through outlet port 15 into air chamber 21. From chamber 21 the air is directed into the combustion chamber 9 through controlled valve 16. This valve is controlled by a cam 27 on the motor shaft 7. Slightly in advance of the full opening of the air valve the fuel valve 17 is opened and fuel is sprayed into the combustion chamber 9 and ignited by the spark plug 24. The explosion drives the rotor 4 in the direction of the arrow and air is gradually delivered through the valve 16 to maintain combustion. The configuration of the cams 27 and 28 is such that air is gradually supplied so that combustion continues throughout practically the entire rotation of the member 4. When the vane of the motor passes port 14 the combustion gases exhaust through the outlet port.

The fuel pump is operated by a cam 29 on the motor shaft 7. The fuel pump supplies fuel to the conduit 32 and to the fuel valve 17 which as stated above is controlled by the cam 28. As shown in Fig. 3 the conduit 32 through which fuel is delivered to the inlet valve 17 has a branch connection 32' through which fuel may be delivered to one or more of the other engine cylinders not shown.

A significant feature of the invention lies in the fact that there is first an injection of the fuel, then it is ignited, then a gradual increase of air to support combustion.

Combustion from the initial ignition to complete combustion is prolonged until the combustion gases are saturated with sufficient air. The timing or degree of rotation of the engine during which combustion takes place is a considerable fraction of the combustion stroke depending somewhat on the heat generated by compression and by combustion.

While the engine has been described as a rotary engine with a rotary compressor, the engine is not limited to this type of engine, but may be readily adaptable to a reciprocating piston type of compressor or motor. The important features of the engine are the air inlet valve and the fuel inlet valve, both of which are time-controlled by a cam which is under control of the operation of the motor.

This application is a continuation-in-part of my prior application Serial No. 223,591, filed April 28, 1951, now abandoned.

What I claim is:

1. In an internal combustion engine having a combustion chamber, a source of compressed air, a valve for controlling the admission of air from said source to the combustion chamber of the engine, said valve operating to deliver first a small volume of air and then a full supply of air, means for supplying fuel to the combustion chamber in advance of the full supply of air to said chamber, the operation of the valve for controlling the admission of the air and the operation of the means for supplying the fuel being synchronized with the operation of the engine.

2. In an internal combustion engine having a combustion chamber and a crank shaft and air supplying means, a fuel pump, a cam shaft drivingly connected to said crank shaft, a fuel valve and an air valve, cams on said cam shaft, one for operating said fuel valve, another for operating said air valve first to partially open said valve to supply a small quantity of air and then to fully open said valve to supply a full volume of air, and a third for operating said fuel pump, the first said cam operating to open the fuel valve in advance of complete opening of said air valve, whereby a continuous prolonged combustion is effected in the combustion chamber.

3. In an internal combustion engine having a combustion chamber, means for supplying combustion supporting air to said combustion chamber comprising a source of compressed air and a valve controlling the flow of air from said source to said combustion chamber, a fuel pump, a valve for controlling the flow of fuel from said pump to said combustion chamber, a cam shaft driven by said engine, cams on said cam shaft, one for operating said pump, another for operating said fuel valve, and the other for operating said air valve first to open said valve partially and then to open it fully, said cams being so designed as to operate the fuel pump and open the fuel valve in advance of full opening of the air valve to effect a prolonged continuous combustion in the combustion chamber.

References Cited in the file of this patent

UNITED STATES PATENTS

| 894,492 | Fulton | July 28, 1908 |
| 923,054 | Lietzenmayer | May 25, 1909 |
| 1,645,170 | Whaley | Oct. 11, 1927 |
| 2,468,451 | Kutzner | Apr. 26, 1949 |
| 2,484,009 | Barber | Oct. 11, 1949 |

FOREIGN PATENTS

| 44,897 | Switzerland | Oct. 21, 1908 |
| 134,073 | Great Britain | Oct. 30, 1919 |